Oct. 27, 1931.    R. L. McELROY ET AL    1,829,714
ART OF FIRE FIGHTING AND FIRE PROTECTION
Original Filed May 26, 1921    2 Sheets-Sheet 1
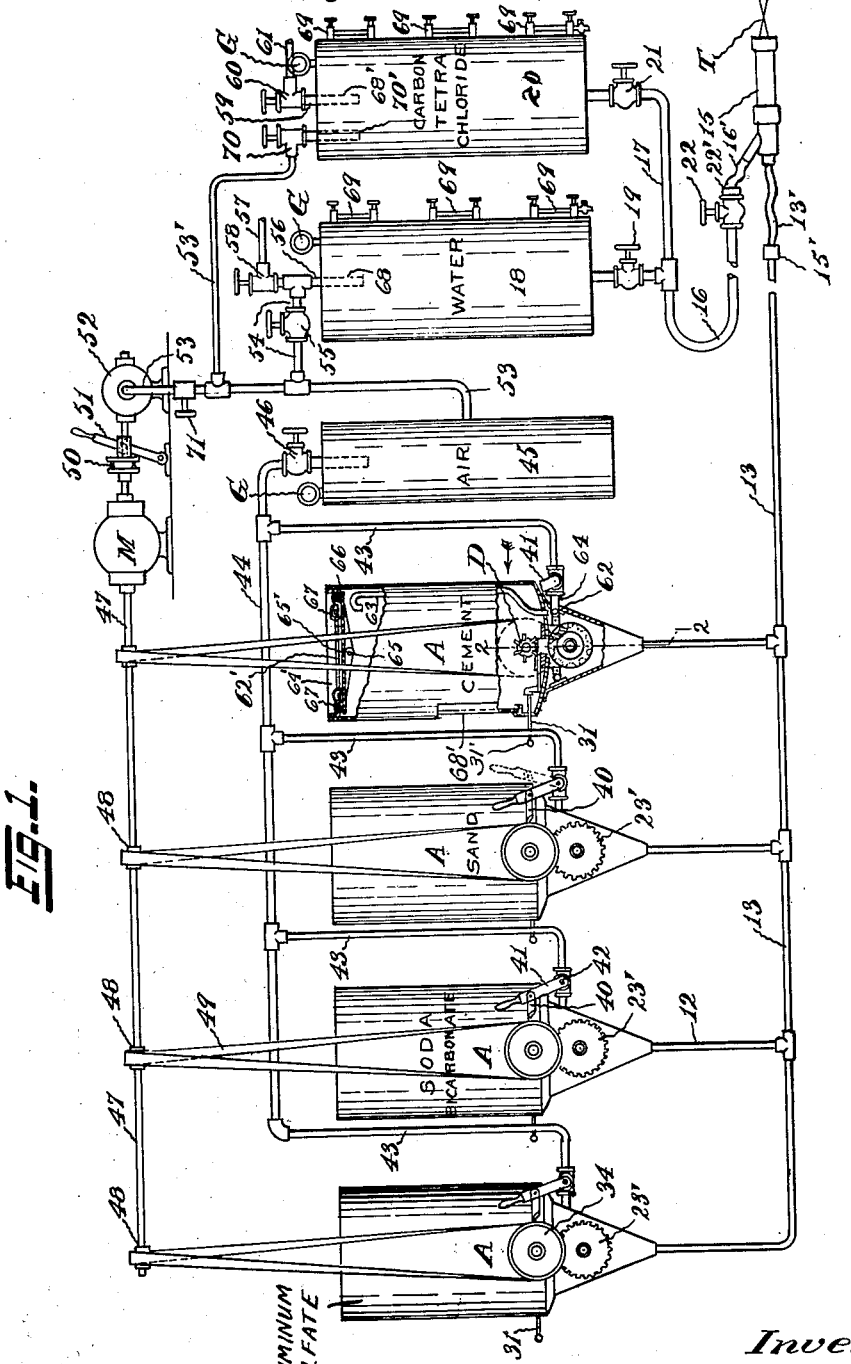
Witnesses:
L. C. Badeau
Clarence Ladd Davis
Inventors:
Robert L. McElroy,
John E. Shepherd,
By their Att'y, F. H. Richards Oct. 27, 1931.  R. L. McELROY ET AL  1,829,714
ART OF FIRE FIGHTING AND FIRE PROTECTION
Original Filed May 26, 1921  2 Sheets-Sheet 2
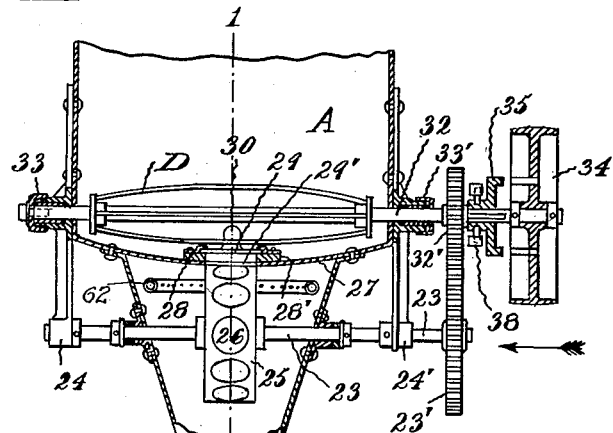
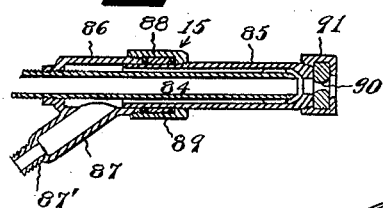
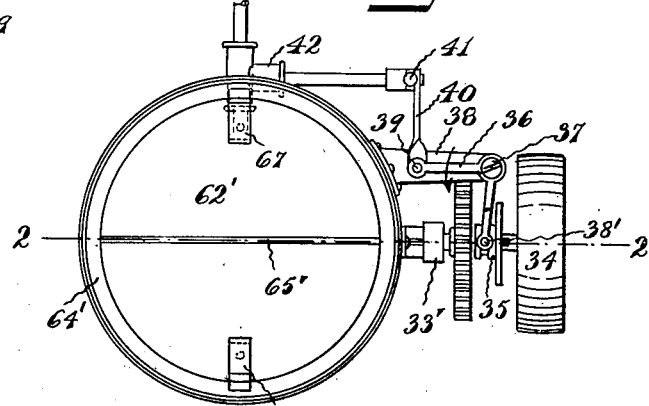
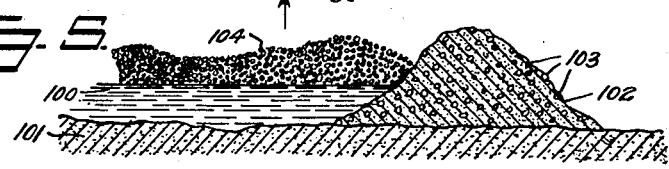
Witnesses:
L. C. Badeau
Clarence Ladd Davis
Inventors:
Robert L. McElroy,
John E. Shepherd,
By their Att'y, F. H. Richards.

Patented Oct. 27, 1931

1,829,714

UNITED STATES PATENT OFFICE

ROBERT L. McELROY, OF DAYTONA, FLORIDA, AND JOHN E. SHEPHERD, OF CHARLOTTES-VILLE, VIRGINIA, ASSIGNORS TO McELROY, SHEPHERD & COMPANY, OF DOVER, DELAWARE, A CORPORATION OF DELAWARE

ART OF FIRE FIGHTING AND FIRE PROTECTION

Application filed May 26, 1921, Serial No. 472,804. Renewed February 14, 1931.

Our invention embodies a new and novel method or methods of fighting and extinguishing fires, whereby a fire-smothering and fire-protective coating or blanket, or a fire-stemming barrier or even a fire-stemming dam or dyke may be effectively applied to burning surfaces or materials or combustible surfaces or materials or fire zones generally to be protected against fire, whether such materials present horizontal, vertical or inclined surfaces and whether such materials are liquid or solid, thereby to exclude air, to smother the fire, to form a barrier to the propagation and spread of fire, and to form dykes and dams, if necessary, for confining the combustible materials, such as oil and the like.

Our invention further contemplates a fire-smothering and fire-protective coating or blanket or a fire-stemming barrier or a confining dyke or dam, formed of a pourable, gas-filled and gas-emitting plastic mass generated by our method or process from solid, granular, or undissolved gas-producing chemical reagents and an agent which will retard the liberation of gas from the ultimate resultant plastic mass. The gas-producing reagents may be any suitable and heretofore known gas-producing reagents, such as aluminum sulphate and sodium bicarbonate;—while the reagent for retarding the liberation of the gas from the ultimate resultant plastic mass may be any of the known reagents which will alter or change the surface tension of water or liquids, and of the resultant mix in general, such as cement, silicate of soda, albumen, plaster of Paris, and other similar materials, or combinations of any, so that gas created by chemical reaction between two gas-producing reagents, or by heat, or both, in a solution of said gas-producing reagents in water or other liquid, will not be freely liberated from the mix as fast as produced, but will be substantially confined or retained within the mix in the form of bubbles, or its liberation retarded by reason of the greater "body" or changed surface tension of the water or other solvent and of the ultimate mix, resulting from said gas-retarding reagents, which causes a substantial retention of the gas produced within the mix or resultant mass, so that said mass becomes and is a gas-filled plastic mass of a multitude of gas-filled bubbles or particles from which the gas is liberated at a much retarded rate; the retardation, or conversely, the liberation of gas depending upon the quality and quantity of reagents used, particularly upon the quality and relative quantity of gas retarding reagent used and depending also upon the temperature to which the mass is subjected, so that a relatively constant foam, or more broadly, a gas-filled plastic mass, may be maintained for a sufficient length of time to be effective in its desired fire-smothering, blanketing, stemming or damming action.

Such method or methods, embody means or instrumentalities, whereby fire-extinguishing or suffocating gases may be highly developed, such gas or gases being generated from their chemical basic salt or salts substantially at the fire or other required zone of deposition, or while in transit thereto, as more particularly hereinafter set forth; so as to obviate a degradation or deterioration of the fire-fighting compound by chemical reaction.

Our system also contemplates the addition of matter, whereby under certain conditions the fire may be controlled or so deadened as to permit of the more efficient use of the fire extinguishing compounds; and by the introduction of these new mediums the technique of fire fighting is advanced, the scope of the trained fire fighter greatly enlarged, and the fires more effectively subdued in less time than heretofore.

A further object of our invention consists in the combining of the chemical salts with a liquid, sometimes not a solvent thereof, whereby the liquid is utilized to carry the undissolved chemical content to the fire, thereby permitting the heat of the fire itself to act upon such chemicals to liberate fire suffocating gases. And in addition thereto it is proposed that some chemical combinations, in addition to being efficient fire fighting compounds, will also be combined to form a continuous film upon surfaces not already in combustion; and also form a like film upon the surfaces after the fire on same has been extinguished, thereby protecting them from surface combustion and leaving them fire resistant.

Another object of our invention is to utilize fire fighting compounds of such a nature that under certain conditions the chemicals used will not only be of fire fighting efficiency, but, being in the form of flocculent precipitates, upon the vaporization of the water therefrom and by crystallization, are easily removed from goods of certain kinds without any damage whatsoever thereto.

While it may be desirable in our system of fire fighting to utilize inorganic compounds for any and all desired reagents, it is obvious that various organic compounds may be also utilized where certain features are desired. For instance, should it be desired to coat flaming material with a protective fire fighting foaming-film, silicate of soda combined with certain acids, or other gas-producing reagents and albumen, may be utilized, thereby forming a lather of foam-like minute bubbles containing fire extinguishing gases.

By actual experiment carried on for a long period of time, we have discovered amongst other desirable inorganic compounds, useful for our above mentioned purposes of forming, and coating flaming material with a foaming film or lather containing albumen and silicate of soda, that a mixture of dry soda-bicarbonate and aluminum sulfate, in certain proportions, with water, makes a very desirable fire extinguishing and foam producing fluid, because of the fact that when it is mixed with sufficient water it is easy of application at the desired point; forms and releases vast quantities of carbon-dioxide gas in the presence of the flame, and where it strikes surfaces not under combustion it quickly forms a lather-like surface film or coating, of extremely tenuous, tough, tenacious, adhering quality, practically incombustible; and of sufficient strength to protect the non-burning surfaces from fire should it spring up again. Furthermore, so long as the mixture remains in this lather-like wet state this coating remains substantially unchanged, and due to the slow dissolving of the soda-bicarbonate in the water, a constant foam is created, the bubbles of which are constantly bursting and releasing carbon-dioxide gas. This foam is constantly being generated so that the fire deadening blanket is constantly being renewed until the liquid content of the mixture has entirely evaporated. And even after, and when so completely dehydrated, while the film still remains closely adhering to the applied surface, and has lost its large tenacity and tenuousness, is more or less porous, and quite friable it will still remain indefinitely thereon, and yet is easily removed by a simple brushing action. In such dehydrated and adhering state the flocculent film-like coating above noted still retains a large proportion of its fire preventing and extinguishing qualities and functions, for as soon as this comes into contact with the flame it immediately releases quantities of carbon-dioxide under such heat action; and this is also true when such mixture is deposited on the fire in any manner, in the granular crystalline state.

We have also discovered and claim that where our foam materials are kept dry, and are mixed with water while in transit and immediately before application to the burning material, there results a highly flocculent material that produces, first, a breaking up of the water into minute particles which meet the fire or are subjected to heat after the resultant mix or mass is laid or deposited in the fire zone, and in consequence steam is very rapidly formed and this sudden conversion of the liquid water into the vapor steam, with its necessary attendant, enormous absorption of heat results in lowering the temperature to a point below the combining temperature of carbon and oxygen, thus preventing further combustion; and second, the wetting and dampening effect produced by the water present that has not been converted into steam, together with the blanketing effect produced by the highly flocculent material, excludes the oxygen and blankets the burning surfaces with the carbonic acid gas and acts as an extinguisher of the fire.

Investigation and comprehensive test have determined that the heretofore accepted theory of the superiority of the soda-acid type of fire extinguisher over an equivalent amount of plain water is largely disproven, except in so far as the soda-acid type of extinguisher allows the very rapid creation of power available for the discharge of the water content. By reason of the very watery material that does reach the fire from soda-acid types of fire extinguishers, no blanketing or smothering material is present that will exclude oxygen from contact with the fire, and therefore such fire extinguishing material so discharged, that does reach the fire, is practically no more efficient than an equal amount of water.

In order to obtain the greatest efficiency from the inorganic compounds, it becomes desirable that not only shall they be kept in commercial form unassociated with other combining chemicals, either hydrous or anhydrous, but that they be not mixed with water, except at the time of use, and this for the reason that mixing with water releases large quantities of carbon dioxide from the soda combination which is therefore lost, and obviously such loss reduces the efficiency of the compound. It therefore becomes desirable to provide means whereby the organic or inorganic compounds may be applied to the fire in substantially unsaturated and undissolved condition, and this particular condition may be met by utilizing a stream of water, or air, or carbon-tetra-chloride, or mingled air, water and carbon-tetra-chloride, as a carrying fluid vehicle for such granular inorganic compound, and the introduction of the dry inorganic chemical salts or compounds into the liquid vehicle delayed.

To carry out the foregoing requirements we have modified, added to and utilized the cement gun and other structures shown in U. S. patents to Carl A. Akeley, Nos. 991,814 and 984,254, dated May 9, 1911 and February 14, 1911, respectively, for improvements in new process and apparatus for mixing and applying adhesive materials. This system of applying adhesive materials by this apparatus, known as the "cement-gun", utilizes a stream of compressed air or air pressure for bringing down the dry pulverous, granular, or undissolved compounds to the eductor or nozzle of the device, utilizing a source of water to carry, and mix with, the said dry granular, or undissolved materials at the eductor nozzle. When these materials and water are brought together they become sufficiently hydrated to permit of their being applied to a surface, especially vertical surfaces, and there to adhere. The mixing of the dry, granular, or undissolved compounds and the water occurs at the educator nozzle or within a short distance of said nozzle and might be said to be mixed in transit in the moving stream of water, and in the case of soluble inorganic materials, as above noted, the time interval between the mixture with the stream of water, and its contact with the surface being treated, is so small that very little carbon dioxide or other fire fighting gases escape, until they have struck the heated surface in the zone.

According to well recognized principles of chemistry, the velocity or speed of chemical reaction is dependent, among other things, upon the temperature. Thus, the higher the temperature the greater the speed or velocity of the chemical reaction. So, for instance, for about every ten degrees rise in temperature the speed or velocity of chemical reaction will approximately double or even more than double. So, the chemical reaction between the gas-producing reagents of the mix produced according to our novel method or process may be started and may continue to take place at the instant the gas producing reagents are introduced into the flowing water, until after the resultant mix has been poured onto or deposited in the fire zone, depending upon the temperature of the water used. With comparatively cold water, for instance approximately 45° F., the chemical reaction between the gas-producing reagents will be quite incomplete when the mix is discharged and projected or poured into the fire zone, and by far the greater part of the chemical reaction or union or interaction, will take place between the gas-producing reagents, or by far the greater amount of carbon dioxide will be generated, after the mass or mix reaches the fire zone and is subjected to the heat resulting from the fire. So, too, the relative amounts of the chemical reaction which take place beginning with the instant of introduction of the reagents into the flowing water, up to and until sometime after the mix has been deposited in the fire zone, may vary widely, depending upon the initial temperature of the water used and depending upon the temperature to which the ultimate mix is subjected after being finally deposited. Using a relatively warm water, such as would be available in warm climates or warm seasons of the year, more of the chemical reaction would take place before the mix reached the fire zone, or while the mix was in transit, while with cold water, more of the chemical reaction would take place after the mix has been finally deposited, and the balance of the gas-producing chemical reaction would take place in the mass or mix in the fire zone; —the speed or velocity of this latter portion or balance of the gas-producing chemical reaction being dependent, as aforesaid, upon the temperature to which the mass or mix happens to be subjected in the fire zone.

So, too, according to well established principles of chemistry, particularly physical chemistry, the speed or velocity of the chemical reaction will also vary somewhat according to the size of the particles or granules of the reacting reagents introduced into the flowing water. The smaller or the finer the particles or granules of initially solid or undissolved reagents, the faster will be their solution in the flowing water while in transit and even after deposit, and the faster will be the chemical reaction between them.

According to our novel method the velocity of chemical reaction between the gas-producing reagents and hence the speed and velocity with which the carbon dioxide is generated in the mix, but also more particularly the speed with which, or the rate at which, the generated carbon dioxide is liberated from the mass or mix, is controlled or retarded by the retarder or retarding reagent or reagents used, and the relative proportions of such reagent or reagents.

We have found that by the use of the "cement-gun" in the present process, several new methods of handling fires, hitherto unknown, may be introduced, through the peculiar capacity of the "cement-gun". For illustration, we have found that an adhesive cement-like material may be used as a blanket for temporarily putting out fire by excluding the air, and introducing a certain amount of water content thereto. It has been found that fire stops in the form of dams or dikes may be made of this cementitious material, and built up during the progress of a fire, to stop up flue like partitions, or to build an adhesive plastic dike around burning oil, whereby such oil may be confined in pools, and treated with a fire fighting compound as above noted, or the chemical and cementitious materials may be combined at the will of the operator, so as to form an adhesive plastic non-combustible air excluding blanket having a very high content of carbon dioxide forming material that will be continually forming a foam of constantly bursting bubbles constantly releasing fire-killing gases, so that in effect this new fire fighting and extinguishing compound becomes a suitable resistant to fire while in its wet state, as well as being a fire preventive in its crystallized anhydrous state thereafter.

In view of the foregoing discoveries and disclosures, we provide an apparatus similar in some respects to the Akeley type of mechanism usually with certain additions and modifications, which apparatus has a sufficient number of containers, wherein a sufficient quantity of cement, sand, soda bicarbonate, aluminum sulfate, albumen and silicate of soda may be carried in such manner that any one or any desired number of the said compounds in combination may be introduced at will and forced out to the fire zone through the educing nozzle, as the fire conditions at the moment may render necessary.

In the past, it has been customary to utilize chemical fluids for the extinguishing of fires, but in every instance the amount of chemicals so used are carried only in limited quantities and in some instances become so thoroughly hydrated or dissolved as to have lost their efficacy, and upon exhaustion of the container another container would have to be used, but the amount so carried has often been too small for the scope of the fire to be treated. It is obvious that by our improved process a chemical fire extinguishing compound may be applied to the fire as long as the water holds out, and that it merely becomes necessary to see that the dry contents of the containers associated with this mechanism are constantly kept full of the dry compounds, and thereby capable of directing a continuous stream of chemical and fire stopping materials, until the fire has been effectively put out.

In the use of our apparatus, the value of fire fighting compounds that may be used has been greatly enlarged, inasmuch as it permits of the constant introduction thereof to a stream of water, and in certain classes of fires, notably oil fires, such fire fighting or extinguishing materials, may be of organic nature, as the albumen, in others of inorganic nature, or may be of inert or of active material, or of mixtures of any or all such compounds such as hereinbefore set forth to fit the particular case. The fire fighter has at his command the entire gamut of the results of past and present discoveries, and also of all new compounds that may be hereafter discovered, and all of these are available in any unitary or combined form that seems feasible or advisable at the moment.

Furthermore, such compounds and combinations may be made at will by the operator, or water may be used alone, so that with fires, such as gasoline, oil, cloth or wood, the specific fire extinguishing compound indicated therefor may be utilized singly or in combination, and therefore the various kinds of fire be effectually extinguished with such particular compounds as will do the least damage to the goods endangered by the fire.

Our invention is further shown and described in the following specification, of which the accompanying drawings form a part, wherein similar letters or numerals of reference designate like or similar parts wherever found throughout the several views, and in which—

Figure 1 is a longitudinal view in elevation of our new and improved fire fighting apparatus, which we have designed for and prefer to use in the carrying out and performing of our new and improved method or methods of fire fighting herein disclosed and claimed, a certain portion of one only of the containers, and the educing nozzle through which the fire extinguishing fluent and granular material is thrown upon the fire zone, being shown in substantially central vertical section on the line 1—1 of Fig. 2, looking toward the left in the direction of the arrow, in such Fig. 2;

Fig. 2 is a view of the bottom portion of one of the containers or receptacles for the undissolved granular materials used, taken in substantially central vertical section on the line 2—2 of Figs. 1 and 3 looking in the direction of the arrow in such Fig. 3;

Fig. 3 is a top plan view of one of the undissolved material containers or receptacles showing a top plan view of the receptacle, removable cover and exterior mechanism shown in Fig. 1; and Fig. 4 is a view in central vertical longitudinal section of the educing nozzle, of the form of construction which we prefer to use, through which the fire extinguishing materials are forced out into the fire zone, and Fig. 5 represents a somewhat diagrammatic sectional view illustrating various forms of gas-filled plastic masses embodying and resulting from our invention, and also illustrating one of their possible combination of relations to a particular fire zone;—the illustration showing a body of oil, dammed or confined at its borders by banked-up gas-filled plastic masses of suitable consistency, and covered over its surface with a blanketing and fire-stemming layer of gas-filled plastic mass, or stable foam, also of suitable consistency.

Referring to drawings:

In the particular embodiment of our apparatus for carrying out our aforesaid new and improved method of fighting fires, as shown in Fig. 1, the same comprises a plurality of air-tight receptacles, for aluminum sulfate, sodium bicarbonate, sand, cement, etc., the receptacles A being of the same identical mechanism and construction and are airtight. They are substantially cylindrical in form and each provided with a V-shaped delivery or feed hopper or spout 11, to the bottom of which is connected a pipe 12, connecting in turn with a main feed pipe 13, connecting with the educing nozzle 15, which is also connected by a liquid feed-pipe 16 with a pipe 17 connected with the bottom of the water container 18, by way of a stop cock 19, and said pipe 16 is also connected with the pipe 17 leading to the carbon-tetra-chloride container 20, by way of a stop cock 21, the pipe 16 being also connected with the nozzle 15 by way of a stop cock 22.

Mounted within the upper portion of the delivery spout or feed hopper 11, is a feed wheel shaft 23, revolubly mounted in suitable bearing supports 24, 24' (Figs. 2 and 3). Rigidly secured upon said feed shaft 23 at the center is a revolving delivery or feed wheel 25 having delivery pockets 26 in its peripheral surface. The feed wheel 25 is of such diameter that its upper portion is just about even with the upper surface of the bottom plate 27 of the container A, in a feed slot 29' in which the feed wheel fits, and mounted within the container and secured to this bottom plate, in any desired manner, are side supports 28 and 28' in which slides a stop plate 29, having at one end an upward extension 30 rigidly secured to the inner end of an actuating handle rod 31 (Fig. 1), which extends out through the peripheral wall of the drum or receptacle, and is provided with a knob or actuating handle 31'. The slide may be positioned so as to stop feeding of the material within the container by fully closing the feed hole in the container bottom, or, when fully or partially withdrawn therefrom, to permit fall by gravity of the granular contents of the container into the pockets 26 of the feed wheel 25 in the required proportional quantities.

Mounted immediately above the feed wheel and extending entirely across the container and rigidly mounted upon a shaft 32, mounted in suitable bearings 33, 33', is a rotating mechanical agitator D, usually of rod or wire form and shape shown in Figs. 1 and 2, which is rotated by a drive pulley 34, connected with the shaft 32 by a clutch mechanism 35, actuated by the bell crank lever or member 36, vibrating on the screw pivot bolt 37 carried by the supporting arm 38, actuating the clutch 35 by the usual forked member 38'. The bell crank lever 36 is connected at its unforked end by a pivot 39, and connecting rod 40, with the actuating hand lever 41 (Figs. 1 and 3), which hand lever is operatively connected at its lower end with the air pressure valve 42 in the secondary feed pipe 43, all of which are connected at their upper ends with the main air feed pipe 44, in connection with the compressed air reservoir or tank 45, by way of the stop cock 46.

Rigidly mounted upon the end of the shaft 32, exterior to the receptacle A, and close to the clutch 35, is a gear wheel or pinion 32', meshing with the gear wheel or pinion 23', rigidly mounted upon the feed wheel shaft 23, whereby the agitator D is rotated in unison with the feed wheel 25 to break up any lumps of crystalline granular material that may have formed, wherefore the wheel 23', is usually of greater diameter than is the wheel 32', so that the agitator D rotates more rapidly than does the pocketed feed wheel or drum 25.

The carbon-tetra-chloride container 20 has a supply pipe 59 connected by way of a stop cock 60 with a main supply pipe 61, connected with a carbon-tetra-chloride supply (not shown), and fed thereto by gravity or pump pressure.

Located immediately below the receptacle bottom of each of the receptacles A, and surrounding the upper portion of the pocketed feed wheel 25, is an annular air feed pipe or nozzle ring 62, provided with perforations (not shown) preferably on the lower side thereof, and connected with the bottom end of an upwardly extending air pipe 63. The perforated nozzle ring 62, is connected with the air feed pipe 43 by way of a short pipe 64 by way of the stop cock 42 actuated by the hand lever 41, which arrangement equalizes the pressure above the mass of granular material filling the container. The downward blast of air from the perforated nozzle ring, will cause the same air pressure to be maintained above the said mass of granular material as there is in the pipe, and the air from the nozzle thus mingles with the granular material as it falls by gravity, out of the pockets and blows, carries or urges it down through the pipes 12 into the pipe 13, and into the educing nozzle 15.

Actuated by an electric motor M, or any other suitable form of prime mover, is a drive shaft 47, having drive wheels 48, one for each of the containers A, from which wheels 48 to the driving clutch pulley 34 of the immediately adjacent container pass the drive belts 49. Situated immediately adjacent to the motor M, and in actuating connection therewith by way of the clutch member 50, actuated by the hand lever 51, is an air compressor 52, connected with the air reservoir or tank 45, by way of a pipe 53, connected with the water tank or reservoir 18, by a pipe 54 having a stop cock 55; the pipe 54 connecting the feed water pipe 56 in connection with the reservoir at the top thereof and with the water feed pipe 57 in connection with the water pressure supply by way of the stop cock 58.

The air supply is connected with the carbon-tetra-chloride container 20, through a valve 70 by way of a pipe 53' connecting as shown with the air pipe 53, or with the air reservoir 45, as may be most convenient. And usually and preferably a valve 71, usually of the combined check and stop valve type, which by the manipulation of the wheel handle, may be set to fully open, fully closed, or to act as an automatic check valve, is located in the pipe 53, between the air compressor 52 and the pipe 53', connecting with the carbon-tetra-chloride container 20 through the valve 70, and the pipe 70'; and as such pipe 70, as well as the pipes 56 and 59, extend down a considerable distance into the containers 18 and 20, as clearly indicated at 68, 70' and 68', it will be seen that an air pressure chamber will be at all times formed in the top portion of the water container 18, and the carbon-tetra-chloride container 20; and that when the valves 55 and 70 are open, and the valves 58 and 60 are closed, that even though through accident to the motor M or other cause, the air compressor 52 should cease operation and the valve 71, be set in the check position, that the air in the tank 45 will still be sufficient, by such air pressure, to force out the contents of the tanks 18 and 20. And it will also be seen that even when the valves 58 and 60 are fully open, and the carbon-tetra-chloride being fed constantly thereto through the pipe 61, and the water being fed to 18, in like manner, that such air chambers above the lower ends of the pipes 56 and 59 will act as does the air pressure chamber of a pump to cause a constant and steady flow of both carbon-tetra-chloride and water, without pulsation, out through the educing nozzle 15.

We have found by actual experiment and observation, during tests, that while the mixing of the various substances used, is to a certain extent brought about partly in the feed pipes and educing nozzle, that the more perfect intimate mixing is brought about in the released stream in the open air a short distance in front of the nozzle, as the mingled stream of air and granular material from the air feed pipe 13 is fed at an acute angle to the stream of liquid, such as water, carbon-terta-chloride, or both, and that the stream is thereby given a twisting, whirling and crossing motion indicated at T in Fig. 1; whereby the chemicals which produce the fire killing gases, are mainly mingled with the water, and begin to produce such gases practically at that point, while in transit and their escape is retarded by admixture with the water of the other ingredients hereinbefore specified, and consequently, but little of such gas is lost and practically all the gases reach the fire zone in a mixture forming a blanket-like fire resisting coating which will continue to give out non-combustible, inert, fire-killing gases as long as it is wet.

In case of fires of great magnitude, it will of course be necessary to refill the various containers from time to time, and those of the form A, which contain the granular material in a dry state, are each provided with a removable cover 62', which, when in position, will seal the container air tight, and such cover may be of any suitable construction, usually and preferably of the circular form shown in the case of the cement container A in vertical section in Fig. 1, and in top plan in Fig. 3. Such cover being hinged in the middle for purposes of removal as shown at 65, and being made air tight along the line of the hinge by a strip of soft rubber, etc., 65', secured in the hinge slot, which is tightly compressed when such cover is in place; and secured within the receptacle at the top is a securing ring 64 of L-shape in cross section, against the bottom face of which abuts the annular edge of such cover; and secured either to the cover or the L-ring is a rubber or other suitable washer or gasket ring 66, interposed between the ring 64' and cover 62', which washer will be so tightly compressed as to seal the receptacle air tight, when the pivoted securing handles 67 are turned into the securing position shown in Figs. 1 and 3.

The L-ring orifice used with the folding cover shown is circular in form as is such folding cover. To indicate the quantity of material in each receptacle A at any given time, an easily removable and replaceable window 68' of any suitable construction, sealed with thick glass is provided, usually of the comparative shape, position and size shown, and as soon as the top of the mass of crystalline material is seen through the window, preparations are made to at once refill, and in like manner the water receptacle 18, and the carbon-tetra-chloride receptacle 20, are each provided with sight glasses 69 of well known construction, preferably three in number, as shown in Fig. 1, one at the top, one at the center, and one at the bottom, to show the contents, and the air tank 45 and the tanks 18 and 20, are each provided with pressure gauges G as shown.

The formula of one of the most efficient foaming compounds, made from salts, to be kept apart in separate receptacles, and only mingled with the necessary quantity of water or other liquid solvent when in transit to the fire zones by the use of our fire fighting apparatus, includes bicarbonate of soda, and aluminum sulfate, or a mixture in the dry state of such sulfate and bicarbonate of soda in a single receptacle. The required proportionate quantities of air under pressure, water under pressure, and of such salts, in our apparatus, are regulated to a nicety to produce the most perfect foam, merely by regulating the position of the stop-plate 29, over the feed slot 29' by means of the handle 31, so as to widen or narrow the feed slot 29', regulated as to width thereby, whereby the amount of material dropped into the delivery pockets 26, of the rotating delivery drum 25, is varied. The air pressure is regulated by the valve 46, and the water pressure by the valve 19 of the water reservoir. When foam is to be produced, the water pressure is preferably turned full on by opening such valve 19 fully, then the stop plate 29 of the receptacle containing the dry ingredient which it is necessary to use in the greatest quantity is preferably positioned to fully uncover the feed slot 29; and then the like slot of the receptacle containing the other lesser dry ingredient or ingredients hereinbefore referred to, is or are slowly opened until it is seen that a foam of the proper quality and consistency is being produced. And when bicarbonate of soda is used with aluminum sulfate, it is the bicarbonate of soda receptacle that has its feed slot opened to the full, and it is the soda bicarbonate which is first fed to the educing nozzle. We have found by experiments that by using the following approximate proportions of gas forming ingredients with our apparatus and substances for retarding the escape of gas from the mix in carrying out our process of fire fighting, we produce a highly efficient fire destroying foam by using the following formula—bicarbonate of soda,—2.5 lbs. avoirdupois (equals 40 ounces), aluminum sulfate 26 ounces.

That is, the rational proportions of the aluminum salts to that of the soda salt, is approximately 1 to 1.5, or any other suitable foam producing or fire extinguishing compounds may be used, if desired.

The delivery or educing nozzle 15, through which the fire fighting fluent material passes on its way to the fire zone, which we have found most efficient for use in our apparatus herein disclosed in carrying out our method or methods of fire fighting, we claim as our invention only in the method or methods herein disclosed; such type of nozzle, per se, being shown and described in the Akeley Patent No. 991,814, issued May 9, 1911 for apparatus for mixing and applying plastic or adhesive material, known by the common name of "cement-gun", for use in projecting into position stucco or other cementitious material upon walls, etc.

As shown in such Fig. 4 herein, such nozzle comprises inner and outer tubes 84 and 85 and a tubular body 86 in which they are concentrically and coaxially fitted and secured.

The inner tube 84 is made screw threaded at one end and screwed into the coacting female screw threaded contracted end of the body 86 through which it passes; and the flexible pipe or fire hose 13' is connected with the feed pipe 13 by way of the coupling 15', for conveying the granular or crystalline anhydrous material to the nozzle. The body 86 is provided with a branch 87 with the end 87' of which a flexible pipe or fire hose 16' is connected for conveying liquid to the nozzle.

While the apparatus of Fig. 1 is shown herein somewhat diagrammatically, and not shown mounted on wheels or self-propelling truck, the invention is not thus limited.

And it will of course be understood that the pipes 13' and 16' are in practice in the form of flexible air hose of well known form, of such material as will not be deteriorated by contact with the chemicals, and other materials transmitted thereby to any great degree; and also that said flexible hose pipes 13' and 16' may be extended to an indefinite length from the apparatus to reach to the vicinity of the fire zone.

The outer tube 85 is fitted and movable endwise in the open end of the body 86, and is adjustably secured therein by a recessed coupling sleeve 88, which is threaded at one end on the tube 85, and at the other end on the body 86. A packing ring 89 is inserted between metal washers in said coupling sleeve 88 around the tube 85, which prevents the liquid with which the nozzle is supplied from reaching and rusting the screw threads between said tube and sleeve, and thereby interfering with the adjustment of said tube. The tube 85 forms with the inner tube 84, an annular passage for the liquid or liquids, and the bore of said tube 85 is contracted at its delivery end so as to direct the liquid as it is discharged from said annular passage into the stream of air or gas carrying in suspension the anhydrous crystalline or fine granular material as it issues from the inner tube 84.

A mouth piece 90 made of soft rubber, which will not be rapidly worn away by sharp sand and the like, is detachably secured to the delivery end of the nozzle by a flanged coupling ring 91, threaded on the outer tube 85. By the adjustment of the coupling ring on the tube 85, the mouth piece may be compressed more or less, and the area of the orifice therein varied as may be desired, for the most effective operation with different kinds of material, and for different kinds of work.

We do not in any of the claims hereof, intend to limit ourselves to the exact form of construction shown, nor to the exact chemicals mentioned, for instance where we have spoken of carbon-tetra-chloride, we intend to include by such term any other suitable liquid which, when thrown upon or into a fire zone, will by contact with the fire, be disassociated into fire-killing gases. And in like manner by "sand", we mean and intend to include any and all inert or refractory granular materials, which when combined with any cementitious material, such as Portland cement, unslacked powdered lime, plaster of Paris, etc., will harden into a more or less hard stone-like mass, or covering, or coating film, or into a dam or dike, as may be required, by the exigencies of the moment.

The manner of operating our apparatus, in the carrying out and performing of method or methods of fighting fires, is self-evident from the foregoing descriptive specification, and disclosure of such method or methods, and such apparatus, but we do not intend to limit ourselves strictly to the exact construction, or the exact manner of operation set forth in fighting fires, by our said method or methods; as apparatus and method may, either or both, be widely varied, and still be within the broad scope of our invention.

For instance, the first two tanks A may contain the basic salt and the acid respectively. The third tank A may be filled with sand or other material or materials mixed therewith according to the nature of the fire or the use of which the apparatus is put. These materials may be inert (such as sand), organic (such as albumen), or inorganic (such as sodium silicate); or any one or more or all of these may be used. The fourth tank A may contain any cementitious material such as above mentioned, or Portland cement, lime, plaster of Paris or the like.

The tank 45 contains compressed air; the tank 18 water under pressure; and the tank 20 contains, under pressure, carbon tetrachloride or other liquid or poison.

The motor M and pump 52 being in operation, the operator can operate the apparatus in a variety of ways and may by the selective operation of valves 19, 21, 46 and handles 41 deliver any desired amount of the contained materials or mixtures through the nozzle 15 to the place of deposit.

In the case of a fire of flowing oil 100 (Fig. 5), a mixture of the dry acid, basic salt, sand, binder and water might be combined to form a mixture retarding the liberation of carbon dioxide gas and which may be deposited as a gas-emitting plastic dike 102 to stop the flow of oil while emitting from bubbles 103 the fire-fighting gas retained therein.

If the mixture be too soft or too stiff the proportions of ingredients are varied by means of the appropriate control handles.

After the oil has been dammed up to form a pool, lighter material such as albumen for retarding the escape of gas from water may be placed in the sand tank A or cement tank A, in place of the sand or the cement respectively, or the albumen or other retarder may be mixed directly with one of the gas-producing reagents, as convenience dictates, and fed in the same manner as the previously mentioned binder to the water with the acid and basic salt to form and deposit a blanket of foam 104. If the foam is too wet or too stiff, the proportion of ingredients may be adjusted as before. The invention is not limited to dikes or oil, as the foam and various methods may be used under a variety of other conditions.

If the foam forming material is only available as a solution, it may be fed from the tank 20.

The lather-like foam, or more broadly, the gas-filled plastic mass of our novel method is adapted to serve a number of different though interrelated purposes or functions, the most outstanding of which may be classified generally in two classes. Thus, on one hand, under certain circumstances or fire conditions, this gas-filled plastic mass may possess coating, blanketing, barrier, and damming functions, by reason of its plastic, adhering and relatively constant qualities; while on the other hand, under certain conditions of the fire zone, this gas-filled plastic mass possesses the function of liberating relatively large quantities of fire-killing gas.

Thus, if the gas-filled plastic mass of our novel method is applied to non-burning or relatively unheated areas, for fire-protective purposes, the coating, blanketing, barrier, or damming functions of the plastic mass predominate with but a slow and relatively small liberation of the fire-killing gases and with a resultant greater constancy or stability of the plastic mass;—while if this gas-filled plastic mass is applied directly to a raging fire a very considerable part of the plastic mass is broken down by the intense heat of the fire, as it is poured into the fire with the resultant liberation of large quantities of fire-killing gases until the fire has been subdued and the intensity of the heat reduced as a result of the combined "gassing" action of the large volumes of liberated fire-extinguishing gases and the blanketing action of that part of the gas-filled plastic mass which is not broken down and also the cooling effect or cooling action of the wet mass upon the fire zone. Thus, when the raging fire is first attacked by a flow of this gas-filled plastic mass the "gassing" function or effect predominates, while as the fire is gradually subdued by the continued pouring of this plastic mass into the fire, the blanketing effect will predominate. Thus, the several functions of our novel gas-filled plastic masses of our method may be coincidental or simultaneous, or they may be at times, or under certain conditions, more or less segregated or independent of each other. For instance, in putting out a raging fire, most, if not all, the numerous functions of our novel gas-filled plastic mass, are brought into play. So, in putting out a raging fire, the gassing function, the blanketing action, the smothering action, and the cooling action of the gas-filled plastic mass are all brought into play simultaneously, through certain of the functions predominate over others, in relative extent, at successive stages of the fire. Other times, certain of the functions, as for instance the blanketing or coating functions may act independently of the gassing or cooling effect, as for instance, when the plastic mass is used purely for fire protection, as when applied to non-burning but combustible surfaces.

Having thus described our invention, we claim:—

1. A fire fighting method comprising forming a fire-killing-gas-emitting pourable plastic mass, by introducing undissolved gas-producing reagents and a retarding material into jetted water, said mass being capable of emitting sufficient gas for fire fighting, and then pouring said plastic mass at the fire zone while the mass is still emitting gas and forming a fire-fighting blanket therewith.

2. A method of fighting fires which consists in forming a pourable gas-filled plastic mass, by introducing gas-producing reagents and a gas retarding material into jetted water, and in building up an isolating barrier of said pourable gas-filled plastic mass, emitting a fire extinguishing gas on and after deposit.

3. A combustion stopping method comprising forming a pourable plastic mass containing fire-killing-gas-emitting substances, by simultaneously introducing gas-producing reagents and a retarding material, into jetted water, and banking up said plastic mass containing fire-killing-gas-emitting substances.

4. A method of the character described comprising forming a pourable plastic mass containing fire-killing-gas-emitting substances, by simultaneously introducing gas-producing reagents and a retarding material, into jetted water, and banking up said plastic mass containing substances capable of emitting sufficient fire-killing-gas to serve for fire fighting.

5. A fire fighting method comprising separately continuously conveying to a fire zone dry powdered aluminum sulfate, soda bicarbonate and cement and water; and mixing and depositing them at the fire zone while still in motion.

6. A method of fighting oil fires which consists in building up a liquid retarding substance in the form of an isolating barrier which substance emits a fire extinguishing gas on and after deposit.

7. A fire fighting method comprising forming at a fire zone a fire-killing-gas-emitting dike.

8. A fire fighting method comprising forming a pourable, gas-filled plastic mass, by introducing fire-killing-gas-forming reagents and an adhesive retarding material into jetted water, and banking up at a fire zone said plastic mixture of fire-killing-gas-emitting substances and an adhesive.

9. The method of producing and delivering foam, which consists in flowing water from a source of supply toward the point of discharge of the foam, simultaneously introducing into the flowing water, in advance of the point of discharge, a foam-stabilizer and acid and basic gas-generating reagents in solid form, and in quantities requisite to produce a mixture of foam and undissolved particles of said reagents, so that foam is formed when some of each reagent has been dissolved in water and has reacted with the other, and transmitting the resulting mixture through a suitable distance simultaneously to effect the transfer of the foam to a remote point and the dissolving and reaction in transit of undissolved particles.

10. The method of extinguishing fire which consists in separately feeding towards a flowing water supply, a plurality of granular substances of different chemical content, from external sources and separately inert, and delivering them into the flowing water, at substantially the same locus, said substances being maintained inert until contact is had with said water, and forming when combined therewith a suitable foam, and blanketing a fire with the foam.

11. The method of producing and delivering foam, which consists in flowing water from a source of supply toward the point of discharge of the foam, simultaneusly introducing into the flowing water, in advance of the point of discharge, and under the influence of gravity and air-pressure, foam-stabilizing material and and acid and basic gas-generating reagents in solid form, and in quantities requisite to produce a mixture of foam and undissolved particles of said reagents, so that foam is formed when some of each reagent has been dissolved in water and has reacted with the other, and transmitting the resulting mixture through a suitable distance simultaneously to effect the transfer of the foam to a remote point and the dissolving and reaction in transit of undissolved particles.

12. In a method of fighting fire by coating the material to be protected with a fire-smothering and protective gas-emitting foam blanket, the steps which consist in bringing into contact with moving water acting under pressure, substances coacting therewith to form a lather of foam-like minute bubbles containing fire extinguishing gases; said substances including gas-forming reagents and a retardant to the liberation of gas from the mix and being fed into said contact with the moving water and being entrained therein while the water is acting under the influence of water pressure, from which pressure said substances are free before entraining contact thereof with the water.

13. In a method of fighting fire, the steps which consist in bringing into contact with jetted water, acting under water pressure, granular materials forming with said water a lather-like coating mass of relatively constant foam, of adhering quality, containing carbon dioxide gas, said coating mass remaining substantially unchanged so long as the mixture remains in a lather-like wet state and the bubbles thereof constantly bursting and releasing carbon dioxide gas, said materials being free of said water pressure until contact is made by said materials with said jetted water, and said materials being removed by said jetted water, from the point of contact, substantially as fast as contact is made between the materials and water.

14. In a method of fighting fire, the steps which consist in contacting with moving water which is acting under water pressure, and having a velocity head, materials in granular form, including aluminum sulphate, bicarbonate of soda and means for retarding the liberation of gas from the ultimate mix, said materials forming with said water a lather-like coating mass of relatively constant foam of adhering quality, containing carbon dioxide gas, said coating remaining substantially unchanged so long as the mixture remains in a lather-like wet state and the bubles of which are constantly bursting and releasing carbon dioxide gas, said materials being free of said water pressure until contact is made by said materials with said moving water; said water having a velocity sufficient to remove said materials from the point at which initial contact is made with said water, substantially as fast as contact is made.

15. In a method of fighting fire, the steps which consist in constricting water moving under the action of water pressure, and thereafter permitting the expansion of said water, bringing into contact with said water between the points of initial constriction and final expansion thereof, a plurality of undissolved substances coacting with said water to form fire extinguishing gas and coincidentally introducing means for retarding liberation of said gas from the ultimate mix, and combining said water and substances to form a lather-like coating mix, of relatively constant foam of tenuous, tenacious, adhering quality containing carbon dioxide gas.

16. In a method of fighting fire, the steps which consist in bringing into contact with substantially enclosed moving water acting under pressure a plurality of substances coacting with said water to form a fire-extinguishing gas and means retarding liberation of said gas from the resultant mix, said gas-forming substances being delivered simultaneously from separate sources of supply through constricted passages communicating with said water and combining said water and substances to form a lather-like coating of constant foam, of tenuous, tenacious adhering quality, containing carbon dioxide gas.

17. In a method of fighting fire, the steps which consist in introducing different granular reagents, into a plurality of fluid streams, and thereafter subjecting said granular reagents to the dissolving influence of water acting under pressure;—said reagents being capable of and coacting with each other and with water to form a carbon dioxide gas filled plastic mass, from which the liberation of carbon dioxide will be retarded, and which gas-filled plastic mass is adapted to be applied to a fire-zone as a smothering blanket.

18. In a method of fighting fire, the steps which consist in delivering by gravity and air pressure into contact with water moving under pressure, substances reacting in water to form a fire-retardant gas and coacting with water to control the emission of gas from the mix, said water having a velocity head where said substances contact therewith sufficient for removing said substances from the point at which initial contact is made substantially as rapidly as contact is made by said substances with said water, and said substances coacting with the water during such removal to form a fire retardant mass of constant foam capable of spreading as a blanket upon a combustible surface.

19. In a method of fighting fire, the steps which consist in feeding to, and bringing into contact with flowing water acting under pressure, co-mingled aluminum sulphate and bicarbonate of soda and a granular material chemically inert with respect to bicarbonate of soda and aluminum sulphate and a substance co-acting with water to retard emission of gas from the resultant mix, said substances coacting with said water to form a constant foam of tenuous, tenacious adherent quality of sufficient strength to give fire-protection to combustible surfaces.

20. In a method of fighting fire, the steps which consist in discharging foam-forming substances in a constricted stream from a source of supply having a cross sectional area greater than that of said stream, contacting said stream of foam-forming substances with moving water acting under pressure, forming a jet adjacent to the point of contact, said substances including reactive materials forming carbon dioxide gas and material coacting with water to control liberation of gas from the resultant mix.

21. A fire fighting method comprising forming a fire-killing-gas emitting pourable plastic mass, by introducing into rapidly flowing water acting under water pressure, undissolved gas-producing agents and simultaneously introducing material retarding the emission of the gas from the mass, and then pouring said plastic mass at the fire zone while the mass is still emitting gas; said plastic mass forming a fire-smothering blanket.

22. In a method of fighting fire by coating the material to be protected with a fire-smothering and protective gas-filled foam blanket, the steps which consist in bringing into contact with moving water acting under pressure, substances coacting therewith to form a lather of foam-like minute bubbles containing fire extinguishing gas; said substances including acid and basic gas-forming reagents and a retardent to the liberation of gas from the mix for stabilizing the resultant foam; and said substances being fed into said contact with the moving water under the influence of gravity and air pressure and being entrained in the moving water while the water is acting under the influence of water pressure, from which pressure said substances are free before entraining contact thereof with the water.

23. In a method of fighting fire by coating the material to be protected with a fire-smothering and protective gas-filled foam blanket, the steps which consist in bringing into contact with moving water acting under pressure, substances coacting therewith to form gas-filled foam containing fire extinguishing gas; said substances including gas generating reagents and foam-stabilizing reagents and said foam-stabilizing reagents including a mineral ingredient; and said substances being fed into said contact with the moving water under the influence of gravity and air pressure and being entrained in the moving water while the water is acting under the influence of water pressure, from which pressure said substances are free before entraining contact thereof with the water; the mineral ingredient of the foam-stabilizing reagents producing a form-retaining friable wall structure for the gas-filled foam mass when the latter has become substantially dehydrated, thereby to render said protective foam mass more permanent.

24. In a method of fighting fire, the steps which consist in introducing undissolved foam-producing reagents including acid and basic gas-generating ingredients and a foam-stabilizing ingredient, into a plurality of fluid streams, and thereafter subjecting said undissolved reagents to the dissolving influence of water, acting under water pressure; said reagents being capable of, and co-acting with each other, and with water, to form a gas-filled foam mass, from which the liberation of gas will be retarded and which is adapted to be applied to a fire zone as a fire-smothering and fire-protective blanket or coating.

25. In a method of fighting fire, the steps which consist in constricting water moving under the action of water pressure, and thereafter permitting the expansion of said water, bringing into contact with said water between the points of initial constriction and final expansion thereof, undissolved acid and basic gas-generating reagents, and co-incidentally introducing a foam-stabilizing reagent for retarding the liberation of said gas from the ultimate mix, and combining said water and said reagents to form a lather-like coating mix, of relatively constant foam, of tenuous, tenacious, adhering quality, containing carbon dioxide gas.

26. In a method of fighting fire, the steps which consist in constricting water moving under the action of water pressure, and thereafter permitting the expansion of said water, bringing into contact with said water between the points of initial constriction and final expansion thereof, undissolved acid and basic gas-generating reagents, and co-incidentally introducing a foam-stabilizing reagent for retarding the liberation of said gas from the ultimate mix, said foam-stabilizing reagent including a mineral ingredient for rendering the resultant foam and a coating or blanket formed thereof, more permanent and heat-resistant after partial or complete dehydration, and combining said water and said reagents to form a lather-like coating mix, of relatively constant foam, of tenuous, tenacious, adhering quality, containing carbon dioxide gas which will become a friable permanent mass upon dehydration.

27. In a method of fighting fire the steps which consist in discharging, under the influence of gravity and air-pressure, foam-forming substances in a constricted stream, from a source of supply having a cross-sectional area greater than that of said stream, contacting said stream of foam-forming substances with moving water acting under pressure, forming a jet adjacent to the point of contact, said substances including reactive materials forming carbon-dioxide gas and material coacting with water to control the liberation of gas from the resultant mix.

28. A fire-fighting method comprising forming a fire-killing-gas emitting pourable plastic mass, by introducing into rapidly flowing water acting under water pressure undissolved gas-producing material and simultaneously introducing material retarding the emission of the gas from the mass, the introduction of said materials being effected under the influence of gravity and air pressure, and then pouring said plastic mass at the fire zone while the mass is still emitting gas; said plastic mass forming a fire-smothering blanket.

29. A fire fighting method comprising forming a blast of dry fluid, introducing dry fire-killing gas forming materials into the blast, introducing a liquid into the blast near the discharge thereof to form a wet plastic mixture sufficiently wet and plastic to form gas and retard its emission, and depositing the mixture at the fire zone to cause the slow liberation of the gas in the fire zone.

30. A fire fighting method comprising forming a confined current of dry fluid terminating in a blast; introducing dry fire-killing-gas-forming materials separately into the current; holding said materials against combination while in transit; introducing a liquid into the blast near the discharge thereof to form a wet mixture; and depositing the mixture at the fire zone.

31. A fire fighting method comprising forming a confined current of dry fluid terminating in a blast; introducing dry fire-killing-gas-forming materials separately into the current; holding said materials dry and against combination while in transit; introducing a liquid into the blast near the discharge thereof to form and liberate a wet mixture sufficiently wet to form gas and sufficiently plastic to retard the formation and emission of the gas; and depositing the mixture at the fire zone to cause the slow liberation of the gas in the fire zone.

32. A banked plastic mass comprising aluminum sulfate, soda bicarbonate, cement, sand, water and carbon-tetra-chloride.

33. A plastic mass comprising aluminum sulfate, soda bicarbonate, cement, sand, water and carbon-tetra-chloride.

34. A plastic dike of the character described adapted to emit killing gas and stop movement of non-gaseous matter.

35. A fire fighting method comprising forming a confined current of air terminating in a dirigible blast; introducing increments of dry fire-killing-gas-forming materials and cement into the current for conveying them to the blast while dry thereby to mix them in transit; conducting a confined stream of water to said blast and introducing it into the blast near the discharge end thereof to form a wet mixture; and depositing the mixture at the fire zone.

36. A fire fighting method comprising forming a confined flexible current of air terminating in a dirigible blast; introducing increments of dry powdered aluminum sulfate, soda bicarbonate into the current for conveying them to the blast while dry thereby to mix them in transit; conducting a confined stream of water to said blast and introducing it into the blast near the discharge end thereof to form a mixture; and depositing the mixture at the fire zone.

37. A fire fighting method comprising separately storing dry materials including aluminum sulfate, soda bicarbonate, sand, cement and wet materials including water and carbon-tetra-chloride at a distance from the fire zone; forming a confined dirigible current of air terminating in a dirigible blast for conveying materials to a fire; introducing increments of the dry materials into the current for conveying them to the blast while dry thereby to mix them in transit; conducting a confined stream of water and carbon-tetra-chloride mixture from the storage means to said blast and introducing them into the blast near the discharge end thereof thereby to wet the dry materials; and discharging the blast at the fire and depositing at the fire zone a wet mixture of said materials.

38. A fire fighting method comprising banking up a plastic mixture of aluminum sulfate, soda bicarbonate and cement, sand, water and carbon-tetra-chloride.

39. A fire fighting means consisting of a banked up dike comprising materials interacting to give off fire killing gas.

40. A fire fighting mixture comprising aluminum sulfate, soda bicarbonate and cement, sand, water and carbon-tetra-chloride in pourable plastic form.

In witness whereof I have hereunto set my hand this 2nd day of February, 1931.

JOHN E. SHEPHERD.

In witness whereof I have hereunto set my hand this 4th day of Feb., 1931.

ROBERT L. McELROY.